US010347032B2

(12) United States Patent
Engel

(10) Patent No.: US 10,347,032 B2
(45) Date of Patent: Jul. 9, 2019

(54) SLICE REPRESENTATION OF VOLUME DATA

(71) Applicant: Klaus Engel, Nürnberg (DE)

(72) Inventor: Klaus Engel, Nürnberg (DE)

(73) Assignee: Siemens Healthcare GmbH, Erlangen (DE)

( * ) Notice: Subject to any disclaimer, the term of this patent is extended or adjusted under 35 U.S.C. 154(b) by 479 days.

(21) Appl. No.: 14/029,929

(22) Filed: Sep. 18, 2013

(65) Prior Publication Data

US 2014/0085305 A1 Mar. 27, 2014

(30) Foreign Application Priority Data

Sep. 21, 2012 (DE) .................... 10 2012 217 089

(51) Int. Cl.
*G06T 15/08* (2011.01)
*G06T 17/10* (2006.01)
(52) U.S. Cl.
CPC .............. *G06T 15/08* (2013.01); *G06T 17/10* (2013.01)
(58) Field of Classification Search
CPC ......... G06T 1/0007; G06T 2207/20036; G06T 19/20
See application file for complete search history.

(56) References Cited

U.S. PATENT DOCUMENTS

| 5,722,408 A | 3/1998 | Dehner et al. |
| 6,501,826 B1 | 12/2002 | Kropfeld |
| 2004/0264634 A1 | 12/2004 | Claus et al. |
| 2006/0126903 A1* | 6/2006 | Sharony ................. A01K 29/00 382/110 |
| 2007/0053478 A1 | 3/2007 | Tsuyuki et al. |
| 2007/0229500 A1 | 10/2007 | Engel et al. |
| 2009/0128304 A1* | 5/2009 | Zhao ........................ A61B 6/00 340/407.1 |
| 2010/0246915 A1 | 9/2010 | Yamakoshi et al. |
| 2012/0128221 A1 | 5/2012 | Lazebnik |
| 2012/0133651 A1* | 5/2012 | Schmidt ............. H04N 13/0011 345/419 |

(Continued)

FOREIGN PATENT DOCUMENTS

| CN | 1165355 A | 11/1997 |
| CN | 1297150 A | 5/2001 |

(Continued)

OTHER PUBLICATIONS

Policarpo, Fábio, Manuel M. Oliveira, and Joäo LD Comba, Real-time Relief Mapping on Arbitrary Polygonal Surfaces, Proceedings of the 2005 Symposium on Interactive 3D Graphics and Games (ACM, 2005).*

(Continued)

*Primary Examiner* — Jeffrey A Gaffin
*Assistant Examiner* — Richard M Russell
(74) *Attorney, Agent, or Firm* — Lempia Summerfield Katz LLC

(57) ABSTRACT

Slice representation of a volume with the aid of volume data is provided. A selection of a slice orientation for slice representation of volume data is made. A slice is then determined in accordance with the selected orientation. A relief representation is calculated for this slice and used as a relief for the representation of the at least one slice. A vivid representation of slice information is provided.

20 Claims, 7 Drawing Sheets

(56) References Cited

U.S. PATENT DOCUMENTS

| | | | | |
|---|---|---|---|---|
| 2013/0249913 A1* | 9/2013 | Smout | ................ | G06T 15/08 345/424 |
| 2014/0049542 A1 | 2/2014 | Engel | | |

FOREIGN PATENT DOCUMENTS

| | | |
|---|---|---|
| CN | 1923138 A | 3/2007 |
| CN | 101324962 A | 12/2008 |
| CN | 101655993 A | 2/2010 |
| CN | 101843954 A | 9/2010 |
| CN | 102106741 A | 6/2011 |
| DE | 102012214604 A1 | 5/2014 |

OTHER PUBLICATIONS

Policarpo, Fabio, and Manuel M. Oliveira, Relief Mapping of Non-height-field Surface Details, Proceedings of the 2006 symposium on Interactive 3D Graphics and Games (ACM, 2006).*

Fabio Policarpo et al.: "GPU Gems3", Developer Zone, http://http.developer.nvidia.com/GPUGems3/gpugems3_ch18.htmL, printed Sep. 19, 2103.

German Office Action cited in corresponding German Patent Application No. 10 2012 217 089.8, dated Jun. 11, 2013, with English translation.

http://en.wikipedia.org/wiki/Relief_mapping_(computer_graphics), printed on Sep. 19, 2013.

Manuel Oliveira et al., "Welcome to the Relief Texture Mapping Web", p. 1-6, http://www.inf.ufrgs.br/~oliveira/TRM.html, printed Sep. 19, 2103.

Policarpo F. et al; "Real-Time Relief Mapping on Arbitrary Polygonal Surfaces"; Proceedings of the 2005 Symposium on Interactive 3D graphics and games ACM, New York; pp. 155-162; 2005; US.

Wikipedia; "X-ray computed tomography"; Wikipedia, freie Online—Enezklopädie; pp. 1-17; 2012; Sep. 19, 2012.

Chinese Office Action for Chinese Application No. 201310424655.7 dated Mar. 20, 2017 with English Translation.

Chinese Office Action for Chinese Application No. 201310424655.7 dated Oct. 24, 2017 with English Translation.

* cited by examiner

FIG 1 (--Prior Art--)
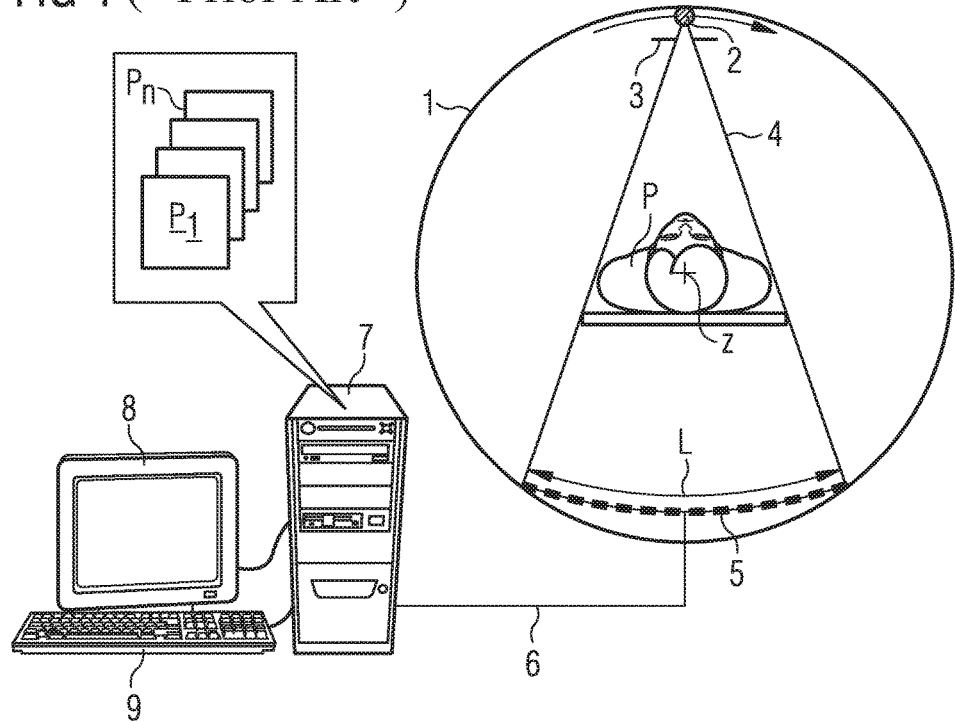
FIG 2 (--Prior Art--)
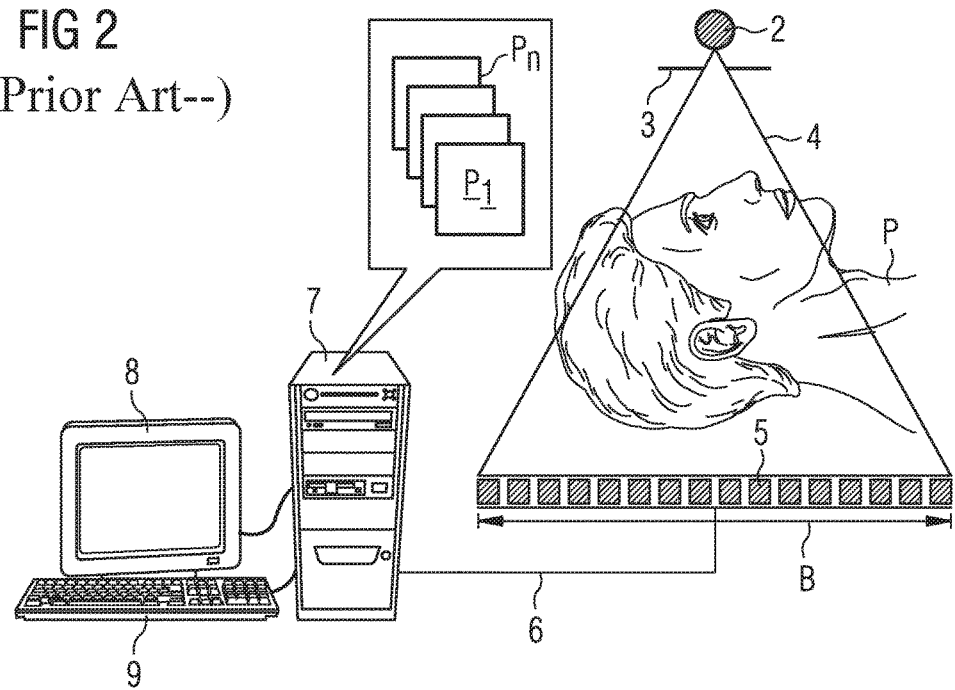

FIG 3
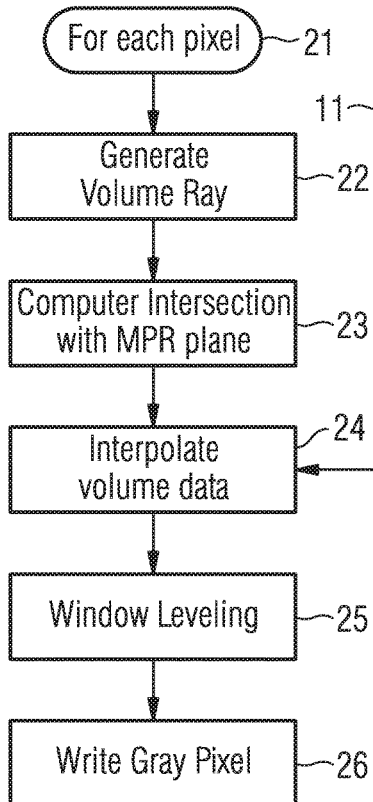
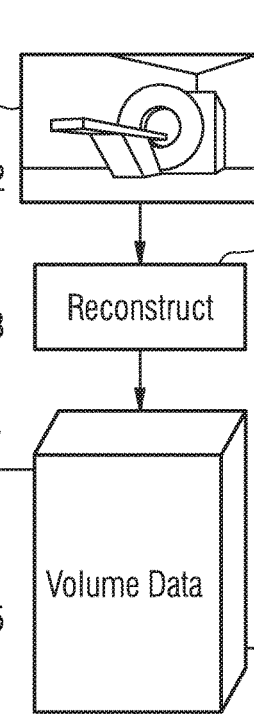
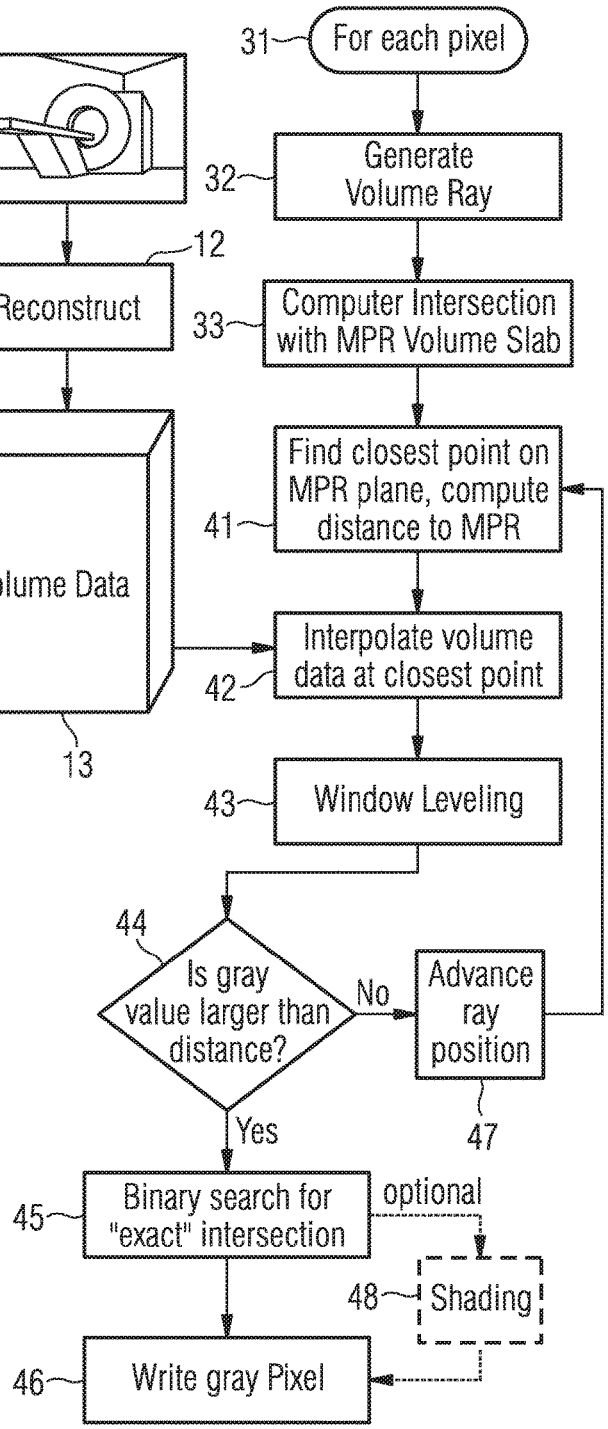

(--Prior Art--)

ent embodiments relate to slice representation of a volume with the aid of volume data.
SLICE REPRESENTATION OF VOLUME DATA This application claims the benefit of DE 10 2012 217 089.8, filed on Sep. 21, 2012, which is hereby incorporated by reference in its entirety.

BACKGROUND

The present embodiments relate to slice representation of a volume with the aid of volume data.

Imaging methods use a range of different technologies by way of which information about the makeup of an object can be obtained. For example, methods which use ultrasound, X-ray radiation or spin excitations (nuclear spin tomography) are common.

Modern methods can resolve information in three dimensions and supply volume data, which are provided as gray values existing for points in space. For example, the gray values constitute a measure of the density of the examined object at the corresponding point in space. Voxels are also referred to in conjunction with these gray values given at points in space. The voxels form a three-dimensional array of gray values. Voxels defined in three dimensions are mapped onto pixels defined in the two dimensions of a screen for visualization of the result of an imaging method.

The term "volume rendering" has become common for the mapping of voxels onto pixels for display on a screen. In various medical imaging methods, the voxels or gray values are present in what are known as axial slices or sections. Axial slices may be slices orthogonal to a marked direction, as a rule designated the z axis. In computerized tomography, this z axis usually corresponds to the direction of movement. The resolution is usually higher within the axial slices than in the direction of the z axis.

The simplest type of visualization is the displaying of the individual axial slices on a screen. The individual slices may be displayed one after the other, for example. Displaying two to four slice images side by side on an appropriately large screen or monitor is an adequate procedure.

Multi-planar reformatting or multi-planar reconstruction (MPR) provides an extension of the axial slice-based display. Slice representations with a different orientation are calculated within the context of this method. Representation of the sagittal and coronal slices orthogonal to the axial sections is common in this connection. In principle, an MPR method may be carried out for any desired orientation of slices. The gray values within the slices are then calculated by way of interpolation and displayed in a suitable manner.

Apart from the MPR methods, there are other more modern methods. In ray casting, penetration of the volume is simulated using visual rays. Nevertheless, MPR methods fulfill an important function for the visualization of object properties because their use has advantages in certain situations. A suitably selected section may provide information, which can only be accessed with difficulty by ray casting. Ray casting may mask or occlude parts of the object.

SUMMARY AND DESCRIPTION

The scope of the present invention is defined solely by the appended claims and is not affected to any degree by the statements within this summary. The present embodiments may obviate one or more of the drawbacks or limitations in the related art. For example, slice representations of volume data may be improved.

According to some embodiments, at least one representation of at least one slice of an object is determined. The determination may be, for example, in the course of an MPR method. This slice is specified or determined from volume data or gray values in accordance with a predefined orientation. This orientation may, but does not have to, correspond to an axial, coronal or sagittal representation. A stack of parallel slices with the selected orientation, or even just a single slice at a predefined depth may be calculated. The term "slice" is used for a two-dimensional entity. For the sake of simplicity, representation of one slice will be discussed. This is meant within the sense of the representation of slice information. The embodiments may use only, for example, a section of a slice.

In one embodiment, measurement data of an object may be acquired during the course of an imaging method, such as computed tomography (CT), magnetic resonance tomography (MRT), ultrasound, positron emission tomography (PET), single photon emission computed tomography (SPECT) or other. The volume data is determined from the imaging method, such as by a reconstruction method. The examined object may be a patient or a work piece examined during the course of material testing.

According to one embodiment, a relief representation of the at least one slice is calculated by way of example with the aid of ray casting or simulated rays. Relief representation is taken to be a representation with spatial or stereoscopic elements in which these elements appear at least partially as variations in height or relief. A reference to a height, taken into account in the representation, is achieved by way of example by specification of a three-dimensional slab of the volume containing the slice. The slab is typically a cuboid which with regard to length, width and orientation of the corresponding side surface matches the slice and the height of which is considerably lower than the other dimensions. As a rule the maximum possible height of the relief is then determined, which for example matches the height of the cuboid or half of it, by way of the height of the cuboid. The slab is preferably selected such that the slice is located at the edge or in the center of the slab. The position at the edge is suitable for a one-sided relief representation, the position in the center for a two-sided, for example double-sided, relief representation.

The inclusion of height information in the representation of the slice may be established by mapping volume data values onto height values (or distance values). A height value is allocated to each required volume data value of the slice. This mapping may include scaling or a standardization which are made, for example, with regard to a slab selected for calculation of the relief. The use of bijective mappings which obtain value relationships is also possible. For example, bijective mappings for compression or stretching are provided, so differences tend to be marked or suppressed.

For calculation of the relief, volume values may be determined, for example, by ray casting whose distance to the slice matches the corresponding height value of the volume value at the next location of the slice. Volume values are optionally determined from the volume data by interpolation. The volume values determined in this way are then used for the representation of the slice as a relief. In this case, the height information derived from volume values of the slice is incorporated such that the height information is used to determine the location whose volume value or gray value is used for relief representation. The location may optionally be within the slab. The use of ray casting has the advantage that the angle between rays and slice may be rendered accessible as a selectable or changeable parameter for an input by the user. The viewing angle may then be varied for improved analysis of the represented relief.

More specifically, the calculation of pixels during the course of ray casting using simulated rays may include the following acts:

A. To calculate the relief along the simulated rays, one location respectively sited on a ray is determined by calculation of volume values, the distance of which location to the at least one slice matches the corresponding height value of the volume value at the next location of the at least one slice. In other words, along a ray, the location is determined whose volume value matches the height value of the next location of the at least one slice. This may also be an approximate determination which is potentially made numerically.

B. the volume value at the next location respectively of the at least one slice is used to calculate a pixel determined by the corresponding simulated ray. In other words, the volume value corresponding to the height value of the next location is used to calculate the pixels.

According to one embodiment, a volume value limitation may be made by a volume value window (i.e., window leveling) or mapping of volume values onto color values. There is the possibility in this connection of applying the volume value limitation or the mapping onto color values to volume values of the at least one slice and to volume values determined for relief representation. Preferably, only one of the two volume value limitation alternatives is used. Mapping onto color values occurs by way of example by transfer functions. The color values optionally also include an opacity value or a parameter describing the light transmission. For example, the color values include alpha values (e.g., RGBA comprising RGB values and opacity).

In addition, shading may be carried out for the volume values determined for the representation. This shading takes into account light effects within the context of an illumination model. Parameters, for example gradient, at the location of the associated volume value of the slice are taken into account here for the shading.

Within some embodiments, slice calculations and associated relief calculations may be made together if required or on-the-fly. After determining or specifying a slice, the associated relief is preferably calculated immediately, before passing on to calculation of a further slice. The directly connected determination of slice and calculation of the associated relief allows practically interactive parameter changes with new calculations. New calculations may result from change of the viewing angle or relief parameter.

The representation may be optically registered considerably better due to the relief representation of slices on a screen. Furthermore, the optical impression of the slices is much more vivid. Details may be resolved and analyzed better by way of appropriate parameter settings.

Other embodiments also relate to a device and to a computer program for carrying out an inventive method for slice representation with a computer.

BRIEF DESCRIPTION OF THE DRAWINGS

FIG. 1 shows one embodiment of a schematic view in the z direction of a spiral CT scanner having a plurality of rows of detector elements;

FIG. 2 shows a longitudinal section along the z axis through the scanner according to FIG. 1;

FIG. 3 shows one embodiment of a MPR method compared to a conventional MPR method;

DETAILED DESCRIPTION

Figure 4:
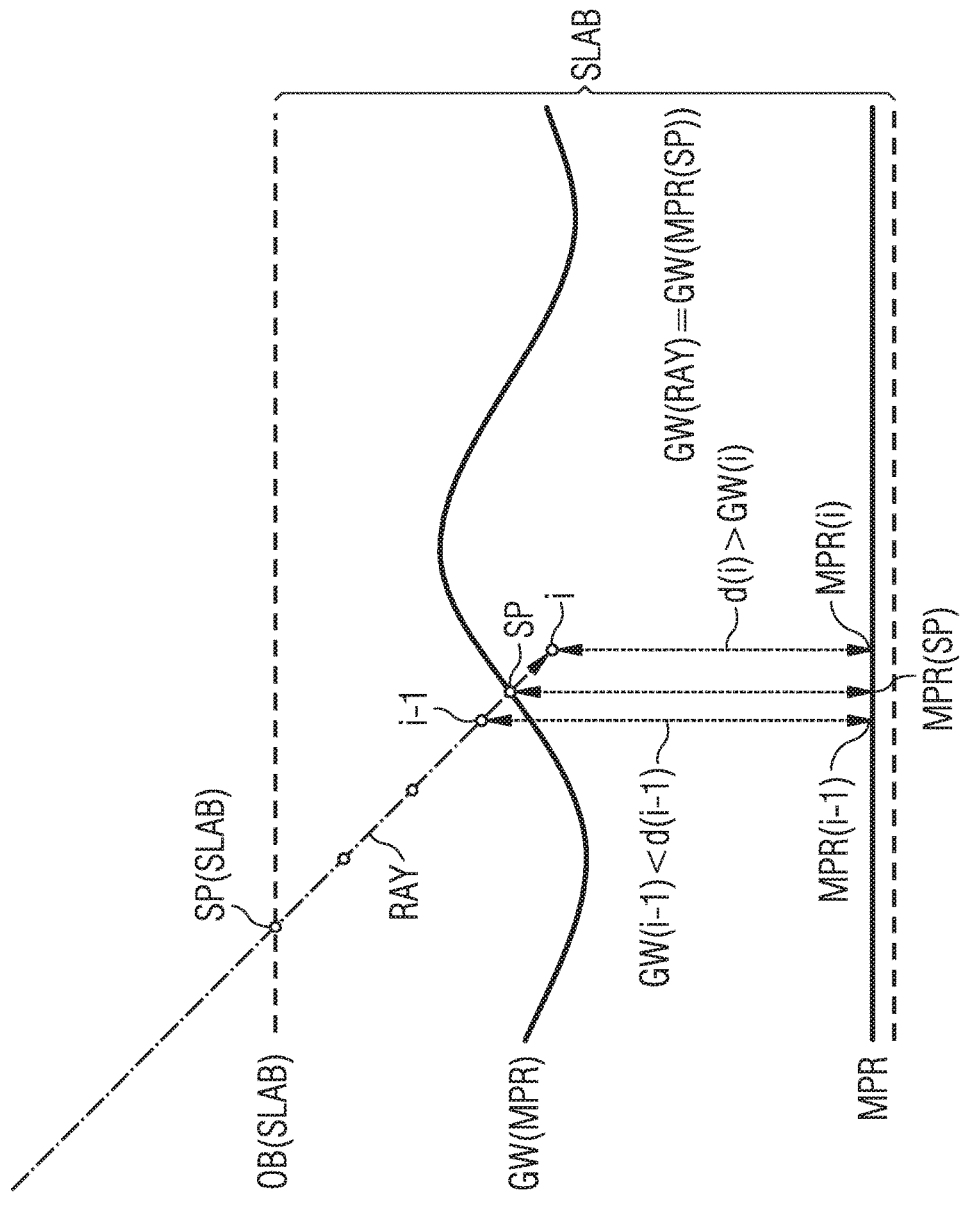
FIG. 4 shows one embodiment of a schematic view of ray casting for an inventive relief calculation.

FIGS. 1 and 2 show a spiral CT scanner with a multi-row detector. FIG. 1 schematically shows the gantry 1 with a focus 2 and a likewise rotating detector 5, with width B and length L, in section perpendicular to the z axis. FIG. 2 shows a longitudinal section in the direction of the z axis. The gantry 1 has an X-ray source, with a schematically illustrated focus 2, and a ray diaphragm 3 close to the source and upstream of the focus. From the focus 2, limited by the ray diaphragm 3, a ray bundle 4 travels to the opposing detector 5. The rays penetrates the patient P located therebetween. Scanning occurs during the rotation of focus 2 and detector 5 about the z axis, wherein the patient P is simultaneously moved in the direction of the z axis. A spiral path S results in this way in the coordinate system of the patient P for focus 2 and detector 5, with a slope or feed V, as is shown three-dimensionally and schematically in FIG. 3.

During scanning of the patient P, the dose-dependent signals detected by the detector 5 are transferred via the data/control line 6 to the arithmetic logic unit 7. Using known methods, which are laid down in the illustrated program modules $P_1$ to $P_n$, the physical structure of the scanned region of the patient P is then calculated or reconstructed. For example, a FBP method, Feldkamp algorithm, or iterative method is used. The physical structure is reconstructed with respect to its absorption value from the measured raw data. The calculated absorption values are then in the form of voxels. In medical imaging these voxels are given by what are known as gray values.

The remaining operation and control of the CT scanner likewise occurs by the arithmetic logic unit 7 and the keyboard 9. The calculated data may be output via the monitor 8 or a printer (not shown). An image is produced from the gray values for display on the monitor 8 or for the generation of images for archiving, such as in a picture archiving and communications system (PACS). This corresponds to mapping of the voxels onto pixels of which the image is composed. Corresponding methods are called volume rendering or volume reproduction. A frequently used method of volume rendering is ray casting or pixel calculation by simulated rays. According to the embodiments, a slice representation is used, however, for example an MPR method, which is explained in FIG. 3.

FIG. 3 shows the inventive procedure compared to a conventional MPR method. The starting point is volume data 13, which is obtained by an imaging method. Data for an object to be examined is acquired by a modality 11, from which data the volume data 13 is obtained in a reconstruction act 12.

The modality 11 may use for example X-ray technology, nuclear spin tomography, ultrasound, PET or SPECT. With the modalities shown in FIGS. 1 and 2, projections of the object are typically captured from different directions, from which projections the volume data is reconstructed by an iterative (e.g., Feldkamp algorithm) or exact reconstruction method (e.g., filtered back projection (FBP)).

The volume data is conventionally visualized as illustrated on the left side of FIG. 3. The right side somes visualization according to the embodiments of the MPR method herein. The procedure for one slice or section will be illustrated below. A slice is defined as a section of the volume data with one plane, wherein the plane may be defined, for example, by a point and two vectors which are not parallel to each other. The slice is preferably specified or input by choosing an orientation and a depth or a distance to the viewer. An input may be made by an input panel or keyboard. For a large number of parallel slices, the procedure may accordingly be such that an image stack (large number) of slices is obtained for a selected orientation of the sections. The slice distance may, in this case, also be an input parameter.

A value calculation is started first of all (acts 21,31) for each pixel of a display on a screen. A ray (acts 22,32) associated with the pixel is propagated from a predefined direction (e.g., as a rule the viewing direction) through the volume.

Conventional and current embodiment procedures differ from each other at this point. Conventionally, the intersection with the MPR slice and by interpolation of volume data 13 or voxels the gray value (or the value of the reconstructed first data) are determined at this intersection (act 24). According to the current embodiments, the rays are used to determine gray values used for the relief representation. For the MPR slice to be displayed, a slab of the volume SLAB is defined which limits the maximum height of the relief (cf. FIG. 4; in this case the lower edge of the slab SLAB coincides with the MPR slice MPR. The distance shown in FIG. 4 is due only to the improved representation). A ray is propagated through the slab. The starting point here is the intersection of the ray (generated in act 32) with the surface of the slab. Once the intersection SP(SLAB) is been determined (act 33), the ray is propagated through the slab in equidistant acts. In act 42, the minimum distance to the MRR slice is calculated and the gray value for this point is determined by interpolation. This gray value is mapped onto a height or length. If this height is smaller than the distance of the ray RAY (query 44), the ray RAY is propagated by a further act (act 47) and the procedure (acts 41-44) repeated. Otherwise the "exact" intersection SP is determined and used for the relief representation.

This is partially shown in more detail in the schematic view of FIG. 4. By mapping gray values onto height values, the gray values of the MPR slice MPR form a type of height profile GM(MPR). In reality, the values of this profile are determined only at relevant locations (for example i−1 and i).

The propagation of the ray RAY within the slab SLAB starts with intersection SP(SLAB) between the ray RAY and the surface of the section OB(RAY).

In act i−1, the distance d(i−1) to the MPR slice MPR is even greater than the gray value or height value GW(i−1) determined by interpolation at this point MPR(i−1). In the next act I, this ratio is reversed (d(i)>GW(i), wherein GW(i) is the gray value of MPR(i)) and the propagation of the ray RAY is terminated. The intersection SP of the ray RAY with the gray values or the corresponding height values GW(MPR) is determined by a binary method (e.g., halving sections, starting with [i−1,i], and center point comparison with GW(MPR) and selection of section with intersection SP). The gray value at the location of the next point MPR(SP) on the MPR slice with respect to the intersection SP is then used for the relief representation (GW(RAY)=GW (MPR(SP)).

FIG. 4 is a simplified view in which the following two aspects are not taken into account.

Firstly, a volume value limitation or window leveling is conventionally carried out. This has the following relevance. In medical applications, a scale, which is named after the scientist Hounsfield, is conventionally used to describe the reconstructed attenuation values and extends roughly from—1,000 (for lung tissue) to 3,000 (bones). A gray scale is allocated to each value on this scale, so overall there are about 4,000 gray scales to be displayed. This procedure, which is conventional in CT in the case of three-dimensional image reconstructions, may not be easily adopted on monitors used for visualization. This is due on the one hand to the fact that a maximum of 256 (i.e. $2^8$) gray scales may be displayed on a commercially available 8 bit monitor. Displaying a higher number of gray scales is not meaningful, moreover, because the granularity of the representation of the display already clearly exceeds that of the human eye, which can distinguish about 35 gray scales. For the representation of human tissue, an attempt is therefore made to extract the details of diagnostic interest. For this purpose, a window is set which includes a certain gray value range defined by a level relevant to diagnosis.

This window leveling is shown in FIG. 3 in acts 25 and 43. In the case of the procedure in FIG. 3, the window leveling is applied to gray values of the MPR slice and thereby limits de facto the height of the relief in the case of the procedure. In other words, the maximum relief height may be adjusted by the choice of window. The maximum possible height is predefined by the slab SLAB which forms the limit if the choice of window would allow a greater height. Alternatively (or in addition), window leveling may also be applied to the gray value of the intersection SP. In FIG. 3, the volume value limitation would be made between act 45 and act 46.

A further, optional act (act 48 in FIG. 3) is the shading of the gray value, determined in act 45, at the position of the intersection SP in order to take account of light effects. For example, local illumination or light model may be used for the shading. For example, Phong shading or a related local illumination model such as the Blinn-Phong model or Warn model are used. Parameters, usually gradient of the volume data, from the location at which the light effects are taken into account typically enter into these models. For example, Phong shading—also called normal vector-interpolation shading—uses an interpolation of the surface normal in the standard case. Usually a portion of a perfect reflection, dependent on the viewing direction of the viewer, and a portion of a diffuse reflection are taken into account in accordance with Lambert's law. The portions of the light intensity are determined from the angular position of light source and observer standpoint with respect to the normal line and are then adjusted to the desired surface impression, such as matt or reflective).

To calculate the light effects for the gray value at the position of the intersection SP, it is preferably not the parameters at this location which are used but the parameters for the next location of the MPR slice. In other words, the MPR slice is raised to calculate shading or light effects.

Figure 5:
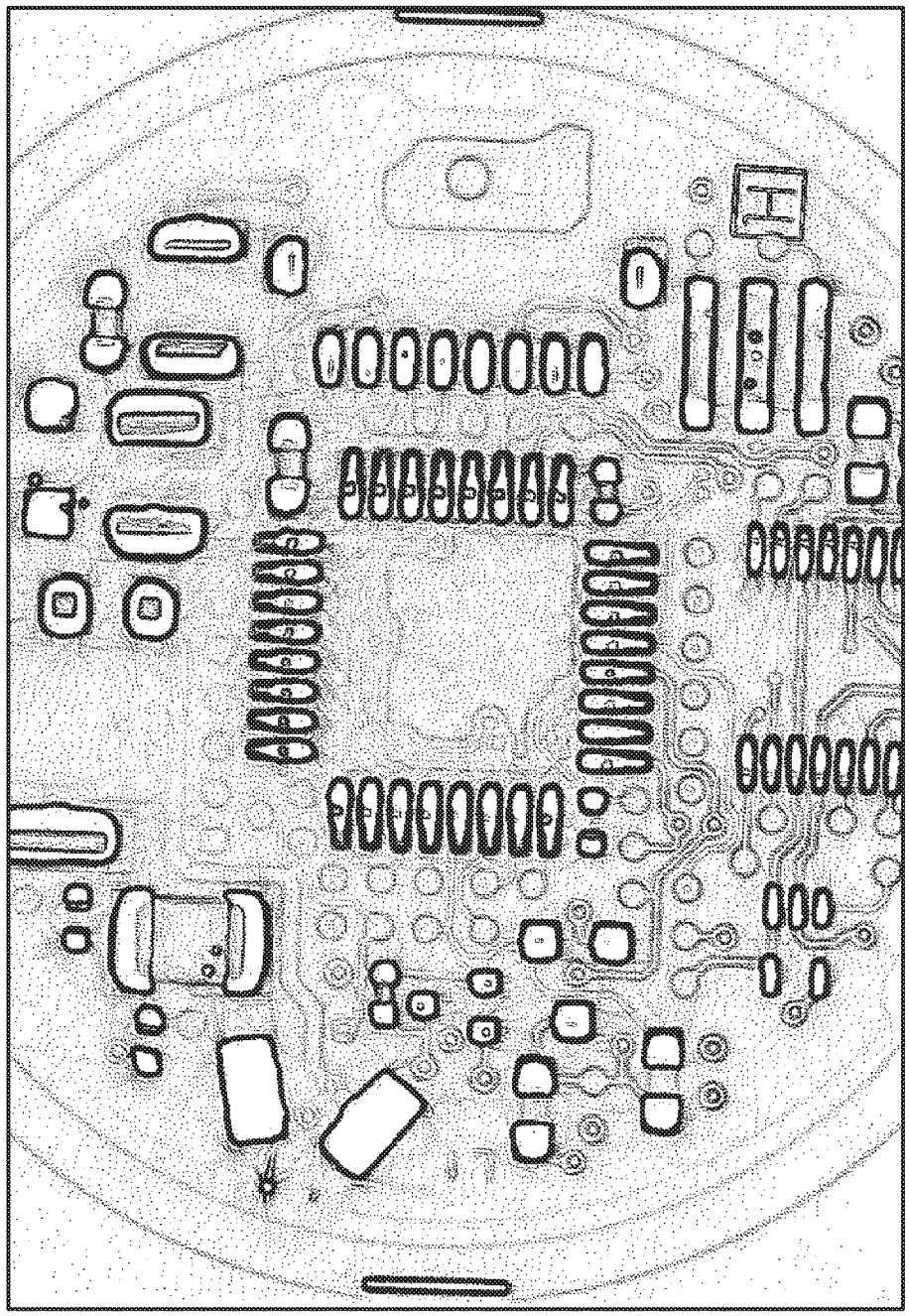
FIG. 5 shows an example slice calculated using a conventional MPR method.
Figure 6:
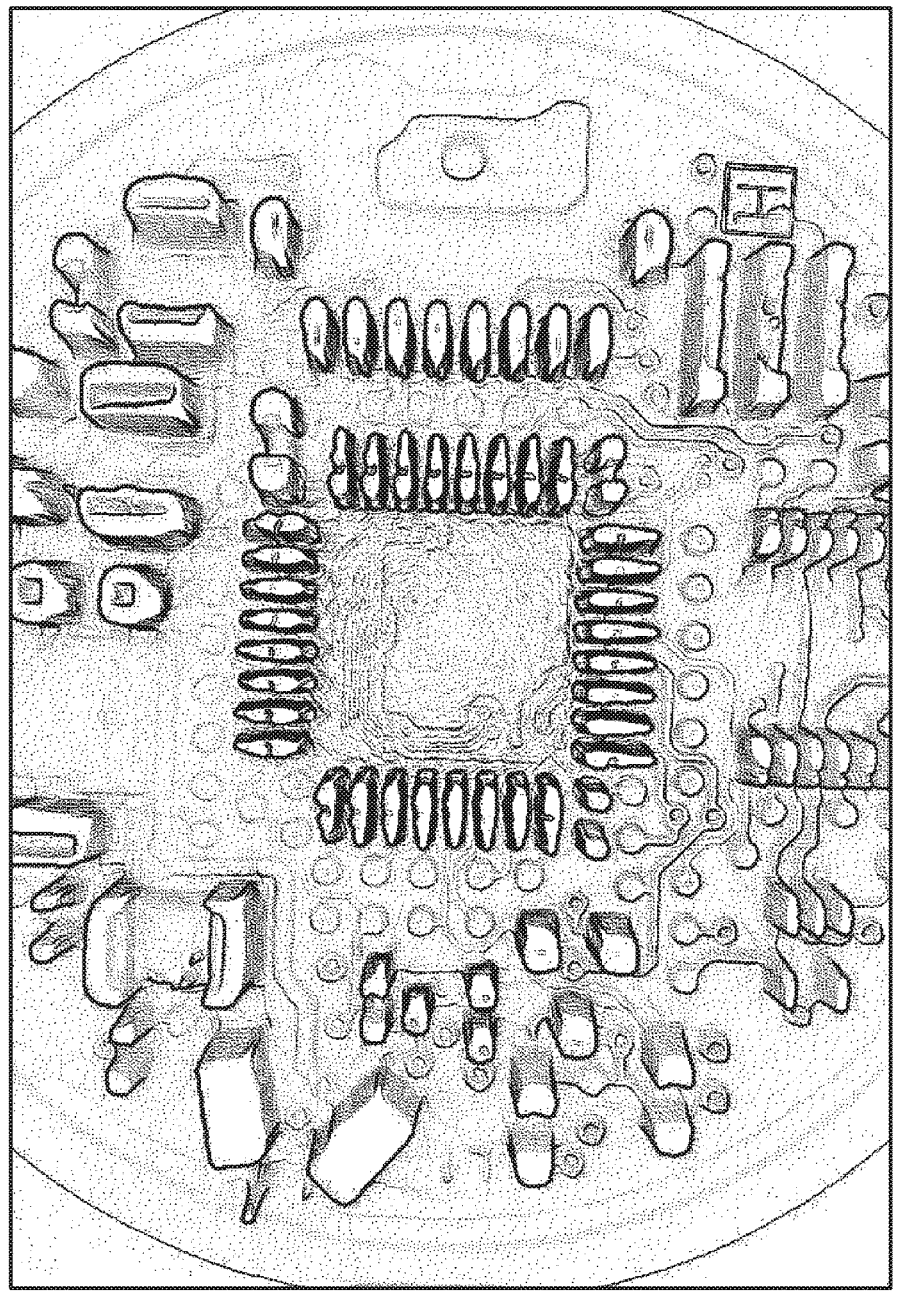
FIGS. 6-8 show example slices calculated using an inventive MPR method.

FIG. 5 shows a representation of a slice using conventional methods (pixels emitted in act 26 of FIG. 3), and FIG. 6 shows the corresponding relief representation (pixels emitted in act 46 of FIG. 3). The representation of FIG. 6 is considerably more vivid and clearer with respect to the slice structure. A further advantage is that improved analysis of the depicted object is possible by varying the parameters used for the relief representation. Therefore, in FIG. 7, the viewing angle is flatter, so elevations are emphasized even more. Properties of the relief may if required therefore be visualized better as peaks or valleys of the relief by way of movement or rotation.

Figure 7:
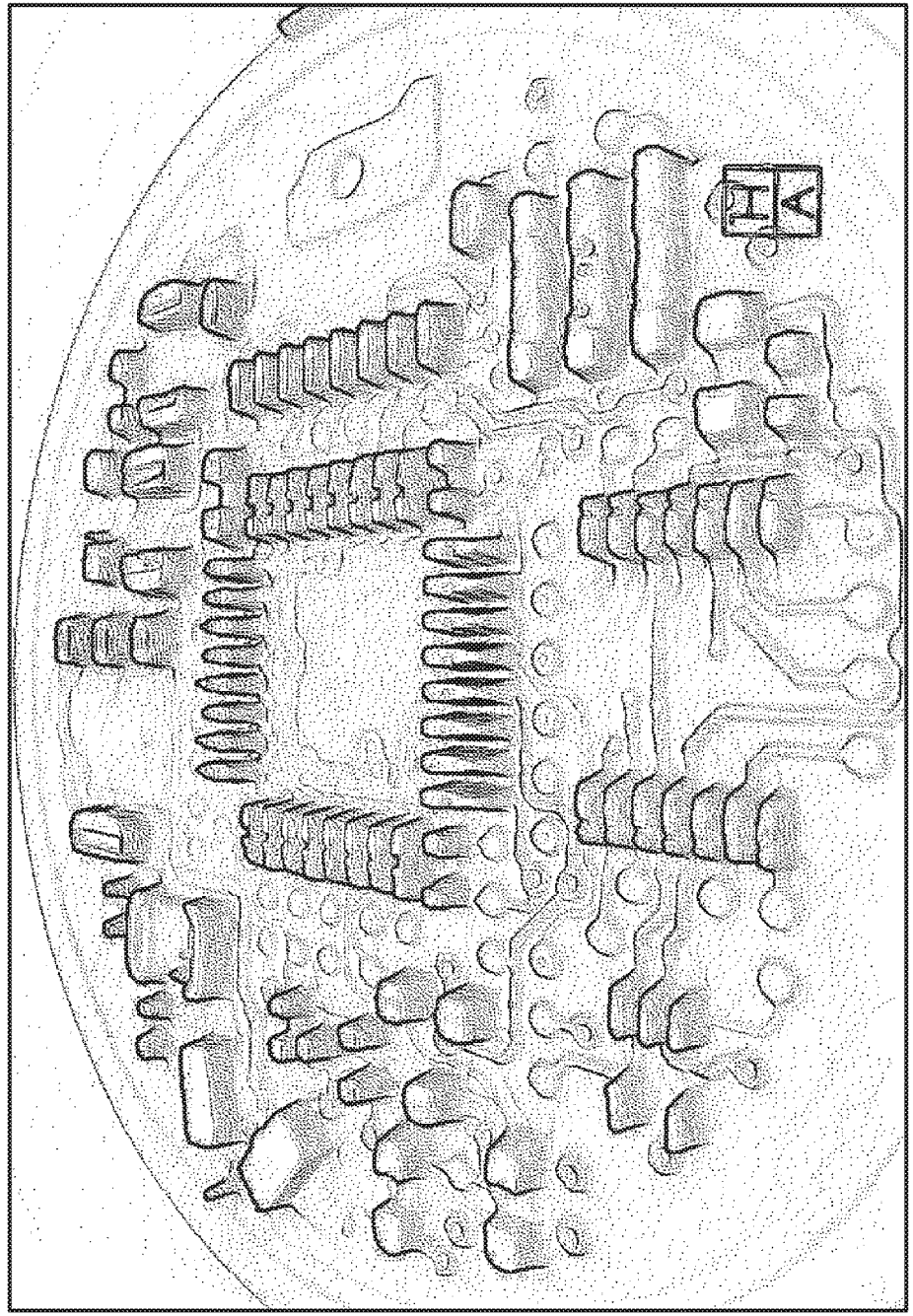
Figure 8:
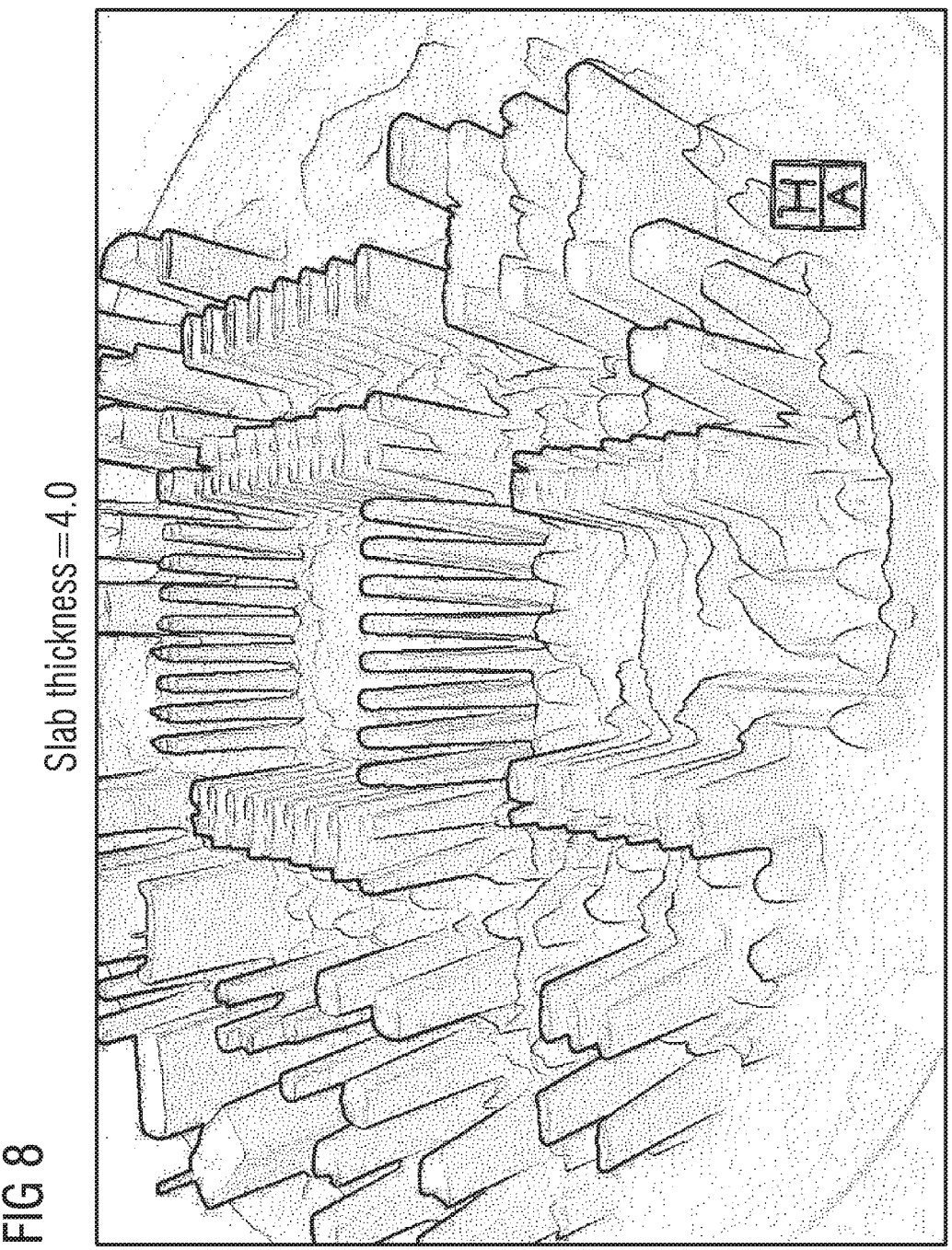

A further parameter is the height of the relief. The height of the relief is influenced by way of example by the height of the slab. This becomes clear for example from FIG. 8 in which a slab which is higher by a factor of four compared to FIG. 7 is selected. In particular, despite the limitation of commercially available monitors (256 gray scales for typical LCD monitors and 1,024 for some special monitors), almost any differences may be resolved in the relief by suitable selection or adjustment of relief height and window parameters. The restrictions of the hardware may be compensated by the embodiments of the method.

The invention is not restricted to the subject matter of the exemplary embodiment. In particular, it can be applied to any volume rendering with slice representation. Corresponding volume data may have been obtained by a wide variety of modalities both for medical examinations and for materials testing.

It is to be understood that the elements and features recited in the appended claims may be combined in different ways to produce new claims that likewise fall within the scope of the present invention. Thus, whereas the dependent claims appended below depend from only a single independent or dependent claim, it is to be understood that these dependent claims can, alternatively, be made to depend in the alternative from any preceding or following claim, whether independent or dependent, and that such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for slice representation of a volume with the aid of volume data, the method comprising:
   selecting a slice orientation for a slice representation of volume data;
   determining at least one slice in accordance with the selected orientation;
   specifying a slab of the volume data containing the at least one slice, a height of the slab less than a height of the volume;
   calculating a relief representation of the at least one slice using height information from the slab of the volume, wherein the calculating comprises calculating the relief representation of the at least one slice by ray casting; and
   representing the at least one slice as the relief representation.

2. The method as claimed in claim 1, further comprising: acquiring measurement data with an imaging method; and determining the volume data from the acquired measurement data.

3. The method as claimed in claim 1, wherein the slice representation occurs within the context of a multiplanar reconstruction.

4. The method as claimed in claim 1, wherein a maximum possible height of the relief is determined by a dimension of the slab.

5. The method as claimed in claim 4, wherein the calculating comprises calculating the relief representation of the at least one slice by ray casting mapping the height information by propagating a ray through the slab.

6. The method as claimed in claim 4, wherein:
   the at least one slice is located at an edge of or in a center of the slab, and
   the relief representation comprises a one-sided or two-sided relief representation.

7. The method as claimed in claim 6, wherein the calculating comprises calculating the relief representation of the at least one slice by ray casting mapping the height information by propagating a ray through the slab.

8. The method as claimed in claim 1, wherein the calculating comprises mapping values of the volume data onto height values, wherein one height value is associated with one volume data value.

9. The method as claimed in claim 8, wherein the calculating comprises:
   determining, for calculation of relief volume values, simulated ray locations where a distance to the at least one slice matches the corresponding height value of the volume value at a next simulated ray location of the at least one slice; and
   using the calculated relief volume values as the relief for the calculated relief representation of the at least one slice.

10. The method as claimed in claim 9, wherein the calculating comprises calculating the relief representation of the at least one slice by ray casting mapping the height information by propagating a ray through the slab.

11. The method as claimed in claim 1, wherein the calculating comprises calculating the relief representation of the at least one slice by calculating volume values from rays simulated during ray casting.

12. The method as claimed in claim 1, further comprising changing an angle of rays simulated during the course of ray casting, the rays enclosing the angle with the at least one slice, where the angle is changeable by a user.

13. The method as claimed in claim 1, further comprising:
   calculating pixels from rays simulated during the ray casting;
   determining, for calculating relief along the simulated rays by calculating relief volume values, one location on a simulated ray where a distance to the at least one slice matches a corresponding height value of a relief volume value at a next location of the at least one slice, wherein the relief volume value at the next location of the at least one slice is used for calculating a pixel of a simulated ray.

14. The method as claimed in claim 1, wherein a relief volume value of the volume data is limited by a volume value window, wherein the volume value window is applied to volume values of the at least one slice, or to volume values determined for the relief representation.

15. The method as claimed in claim 1, further comprising shading volume values, wherein the shading is carried out with parameters at locations associated with relief volume values of the relief representation of the at least one slice.

16. The method as claimed in claim 1, wherein the calculating comprises calculating for a plurality of slices made in accordance with the selected orientation and calculating a relief representation for each of the slices.

17. The method as claimed in claim 1, wherein the height information comprises distances calculated between volume values of the slab and corresponding locations of the slice.

18. A system for slice representation of a volume with the aid of volume data, the system comprising:
   an input interface for selecting an orientation of slices for the slice representation of the volume data,
   a computer configured to:
      calculate at least one slice in accordance with the selected orientation;
      specify a three-dimensional slab of the volume from the volume data, the slab containing the calculated at least one slice; and
      calculate a relief representation of the at least one slice using volume values from the slab of the volume, and
   a screen for displaying the at least one slice while taking into account light effect.

19. The system as claimed in claim 18, wherein the computer is configured to calculate the relief representation of the at least one slice by ray casting.

20. A computer implemented method comprising:
   selecting a slice orientation for a slice representation of volume data;
   determining at least one slice in accordance with the selected orientation;
   specifying a slab of the volume containing the at least one slice;
   calculating a relief representation of the at least one slice using the slab of the volume, the calculating comprising mapping height information as distance values from volume values of the slab to corresponding locations of the slice; and
   representing the at least one slice as the relief representation.

* * * * *